(12) United States Patent
Wallen et al.

(10) Patent No.: US 11,556,169 B2
(45) Date of Patent: Jan. 17, 2023

(54) ADAPTABLE PERSONAL USER INTERFACES IN CROSS-APPLICATION VIRTUAL REALITY SETTINGS

(71) Applicant: Meta Platforms Technologies, LLC, Menlo Park, CA (US)

(72) Inventors: Nicholas Wallen, South San Francisco, CA (US); Matthew Luther, Los Gatos, CA (US); Paulo Melchiori, San Francisco, CA (US); Amir Mesguich Havilio, San Francisco, CA (US); Amber Choo, Burlingame, CA (US); Jesse John Mullen, Hayward, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/174,037

(22) Filed: Feb. 11, 2021

(65) Prior Publication Data
US 2022/0253125 A1 Aug. 11, 2022

(51) Int. Cl.
*G06F 3/01* (2006.01)
*G06F 9/451* (2018.01)
*G06F 3/0482* (2013.01)

(52) U.S. Cl.
CPC ............ *G06F 3/011* (2013.01); *G06F 3/0482* (2013.01); *G06F 9/451* (2018.02)

(58) Field of Classification Search
CPC ......... G06F 3/011; G06F 9/451; G06F 3/0482
See application file for complete search history.

(56) References Cited

U.S. PATENT DOCUMENTS

| | | | |
|---|---|---|---|
| 2013/0044128 A1* | 2/2013 | Liu | G02B 27/017 345/633 |
| 2018/0040044 A1* | 2/2018 | Mattingly | G06Q 30/0617 |
| 2018/0098059 A1* | 4/2018 | Valdivia | G06Q 50/01 |
| 2018/0207522 A1 | 7/2018 | Roman et al. | |
| 2019/0139321 A1 | 5/2019 | Kocharlakota et al. | |
| 2019/0340818 A1* | 11/2019 | Furtwangler | G06F 3/04842 |
| 2020/0020165 A1* | 1/2020 | Tran | G06N 20/10 |
| 2020/0218342 A1* | 7/2020 | Murali | G02B 27/0093 |

(Continued)

OTHER PUBLICATIONS

International Search Report and Written Opinion for International Application No. PCT/US2022/016110, dated Apr. 29, 2022, 12 pages.

*Primary Examiner* — Beau D Spratt
(74) *Attorney, Agent, or Firm* — Baker Botts L.L.P.

(57) ABSTRACT

In one embodiment, a method includes rendering, for one or more displays of a VR display device, a first output image of a VR environment. The VR environment includes a personal UI associated with a first user. The personal UI has a first form factor and a first pose with respect to the first user, is a virtual object comprising one or more 2D virtual displays, and is operable to execute a plurality of applications. The method includes determining whether to adapt the personal UI based on a detected change in a context of the first user with respect to the VR environment. The method includes rendering a second output image of the VR environment, where the personal UI is adapted to have a second form factor and a second pose with respect to the first user responsive to determining to adapt the personal UI based on the detected change in the context of the first user.

21 Claims, 12 Drawing Sheets

(56) References Cited

U.S. PATENT DOCUMENTS

2020/0241730 A1* 7/2020 DiVerdi .................. G06F 3/011
2020/0258278 A1    8/2020 Mirhosseini et al.
2021/0005022 A1* 1/2021 Oser .................. G06Q 30/0281

* cited by examiner

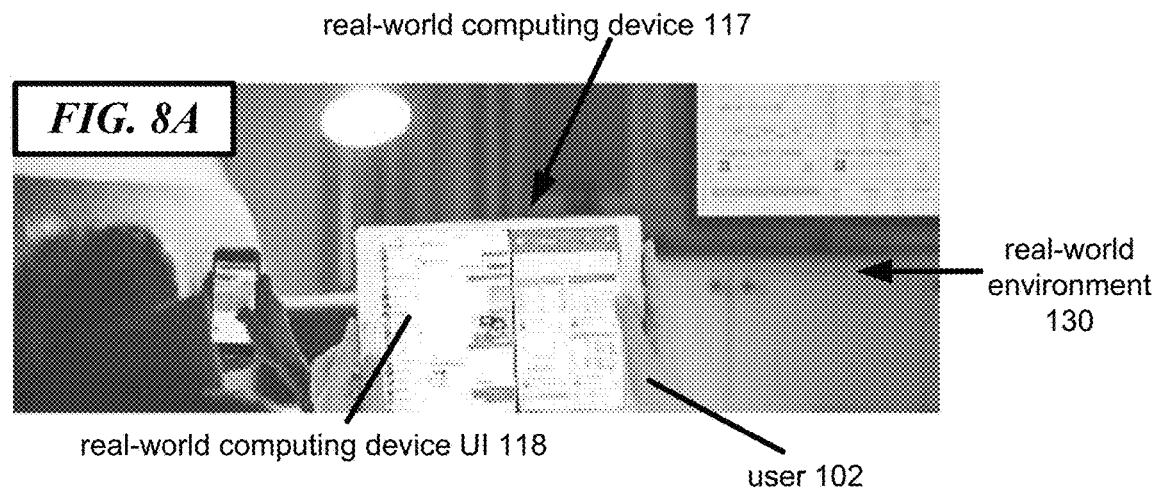
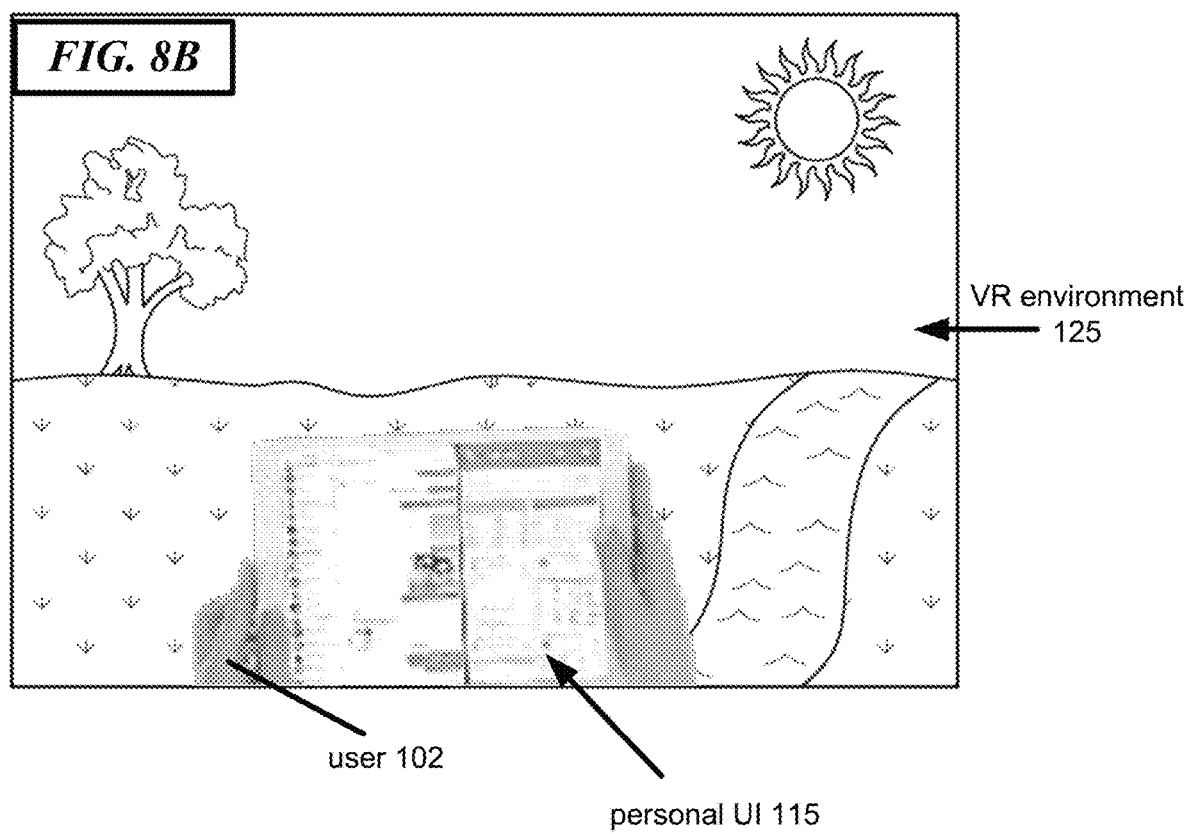

ADAPTABLE PERSONAL USER INTERFACES IN CROSS-APPLICATION VIRTUAL REALITY SETTINGS

TECHNICAL FIELD

This disclosure generally relates to databases and file management within network environments, and in particular relates to customizing user interfaces (UIs) in a virtual reality (VR) setting.

BACKGROUND

Traditionally, a user in a virtual reality (VR) experience may have user interface (UI), like a dashboard or menu, that a user can access while in the VR experience. The UI may appear as a 2D menu or window that is overlaid on a field of view of a user in a VR setting. The UI may have a uniform appearance across different VR settings, thus running the risk of obstructing the user's view in certain VR settings. The UI may be hidden from view and pulled up following a prompt or command by the user. However, the user may lose UI functionality in such situations.

SUMMARY OF PARTICULAR EMBODIMENTS

In particular embodiments, a user of an immersive virtual reality (VR) system (e.g., head-mounted VR goggles) may have their view of the VR environment partially or fully occluded by either the system user interface (UI) or application-specific UIs, and thus risk obstructing their view of the VR environment. The user may hide the UI, but the user would then lose access to the UI functionalities. Thus, one technical challenge may include maintaining access to the UI while the user is within the VR environment and across different VR experiences. One solution presented by the embodiments disclosed herein to address the technical challenge of maintaining access to the UI while the user is in different VR experiences is to adapt the UI to the context of the user with respect to the VR environment, such as by adapting the UI to have a form factor and/or pose (i.e., position and orientation with respect to the user) that best suits the user and the VR environment. The UI may be portable, in that the UI is accessible and maintains its functionalities as the user goes from one VR environment to another or switch from one application to another. And the UI may be personal, private, and customizable to the user's experience in the VR environment. As an example and not by way of limitation, a user may adjust the form factor and the pose of the UI to increase the UI productivity or to decrease the view obstruction of the UI, while still maintaining key UI functionalities. Although this disclosure describes maintaining the UI while the user is in different VR experiences by adapting and personalizing the UI in a particular manner, this disclosure contemplates maintaining the UI while the user is in different VR experiences in any suitable manner.

In particular embodiments, one or more computing systems may render, for one or more displays of a VR display device, a first output image of a VR environment. The VR environment may comprise a personal UI associated with a first user. The personal UI may have a first form factor and a first pose with respect to the first user. The personal UI may be a virtual object comprising one or more 2D virtual displays. The personal UI may be operable to execute a plurality of applications. The one or more computing systems may detect a change in a context of the first user with respect to the VR environment. The one or more computing systems may determine whether to adapt the personal UI based on the detected change in the context of the first user. The one or more computing systems may render, for the one or more displays of the VR display device, a second output image of the VR environment. The personal UI may be adapted to have a second form factor and a second pose with respect to the first user responsive to determining to adapt the personal UI based on the detected change in the context of the first user.

Certain technical challenges exist for maintaining a personal UI while the user is in different VR environments and contexts. One technical challenge may include maintaining UI functionalities without view obstructing or disrupting the VR experience. The solution presented by the embodiments disclosed herein to address this challenge may be to adapt the personal UI based on the context of the user with respect to the VR environment. Another technical challenge may include detecting when a user's context has changed. The solution presented by the embodiments disclosed herein to address this challenge may be to determine a change in the pose of the user with respect to the VR environment and/or objects within the VR environment, receive an input by the user selecting an application that is associated with a change in the form factor and/or pose of the personal UI, or detect a change from one application to another.

Certain embodiments disclosed herein may provide one or more technical advantages. A technical advantage of the embodiments may include automatically adapting a form factor and a pose of the UI responsive to a detected change in context of the user with respect to the VR environment. Another technical advantage of the embodiments may include automatically adapting the personal UI in the VR environment to mimic the UI of a real-world object to help a user acclimate to using the personal UI. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 8A illustrates an example of a first user using a real-world computing device with a computing device UI in a real-world environment.

FIG. 8B illustrates an example of a personal UI for a first user in a VR environment.

DESCRIPTION OF EXAMPLE EMBODIMENTS

In particular embodiments, a user of an immersive virtual reality (VR) system (e.g., head-mounted VR goggles) may have their view of the VR environment partially or fully occluded or obstructed by either the system user interface (UI) or application-specific UIs, and thus risk obstructing their view of the VR environment. The user may hide the UI, but the user would then lose access to the UI functionalities. Thus, one technical challenge may include maintaining access to the UI while the user is within the VR environment and across different VR experiences. One solution presented by the embodiments disclosed herein to address the technical challenge of maintaining access to the UI while the user is in different VR experiences is to adapt the UI to the context of the user with respect to the VR environment, such as by adapting the UI to have a form factor and/or pose (i.e., position and orientation with respect to the user) that best suits the user and the VR environment. The UI may be portable, in that the UI is accessible and maintains its functionalities as the user goes from one VR environment to another or switch from one application to another. And the UI may be personal, private, and customizable to the user's experience in the VR environment. As an example and not by way of limitation, a user may adjust the form factor and the pose of the UI to increase the UI productivity or to decrease the view obstruction of the UI, while still maintaining key UI functionalities. Although this disclosure describes maintaining the UI while the user is in different VR experiences by adapting and personalizing the UI in a particular manner, this disclosure contemplates maintaining the UI while the user is in different VR experiences in any suitable manner.

Figure 1:
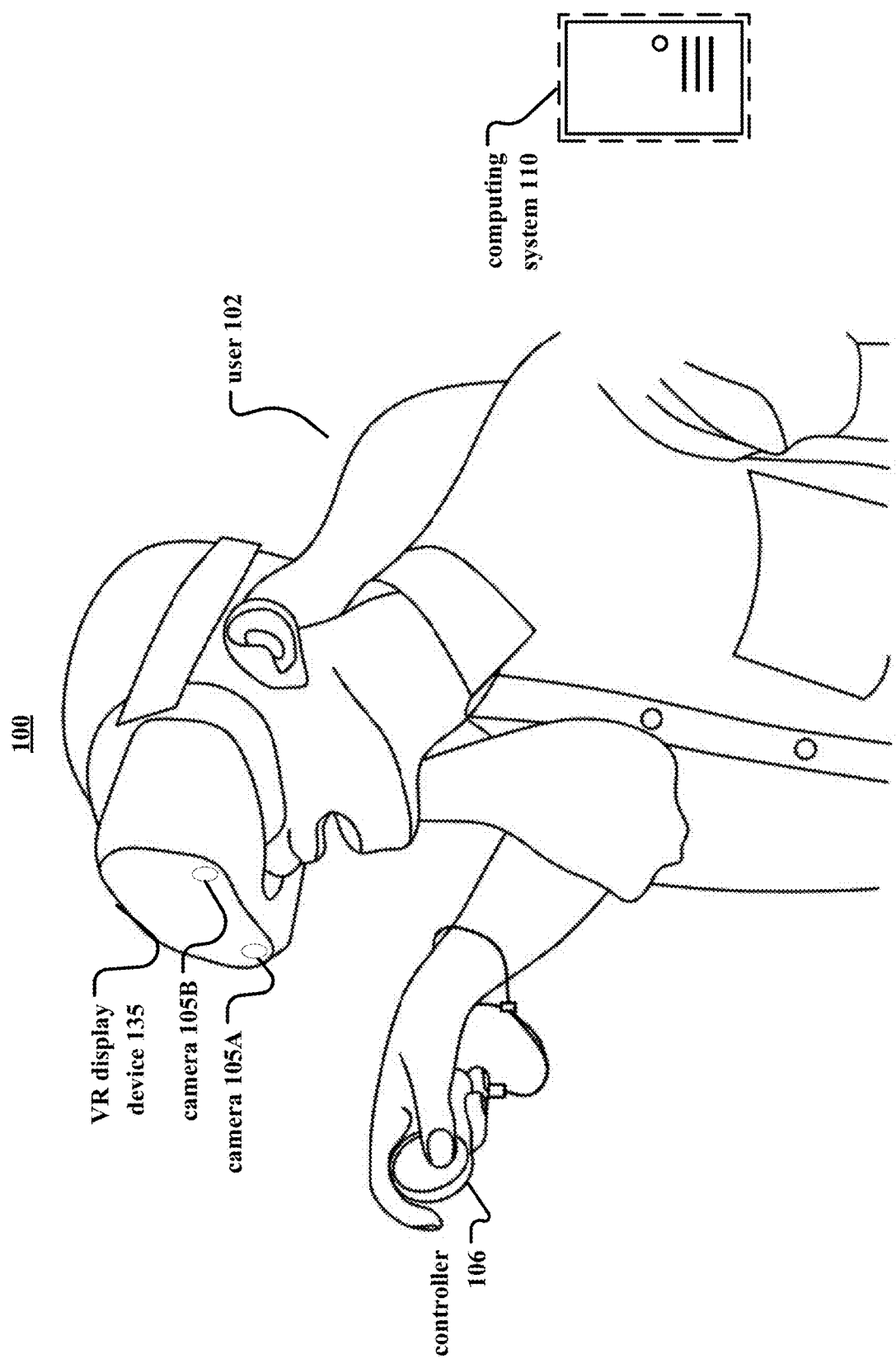
FIG. 1 illustrates an example virtual reality system worn by a user, in accordance with particular embodiments.

FIG. 1 illustrates an example of a virtual reality system 100 worn by a user 102. In particular embodiments, the virtual reality system 100 may comprise a head-mounted VR display device 135, a controller 106, and one or more computing systems 110. The VR display device 135 may be worn over the user's eyes and provide visual content to the user 102 through internal displays (not shown). The VR display device 135 may have two separate internal displays, one for each eye of the user 102 (single display devices are also possible). As illustrated in FIG. 1, the VR display device 135 may completely cover the user's field of view. By being the exclusive provider of visual information to the user 102, the VR display device 135 achieves the goal of providing an immersive artificial-reality experience. One consequence of this, however, is that the user 102 may not be able to see the physical (real-world) environment surrounding him, as his vision is shielded by the VR display device 135. As such, the passthrough feature described herein may be technically advantageous for providing the user with real-time visual information about his physical surroundings.

Figure 2:
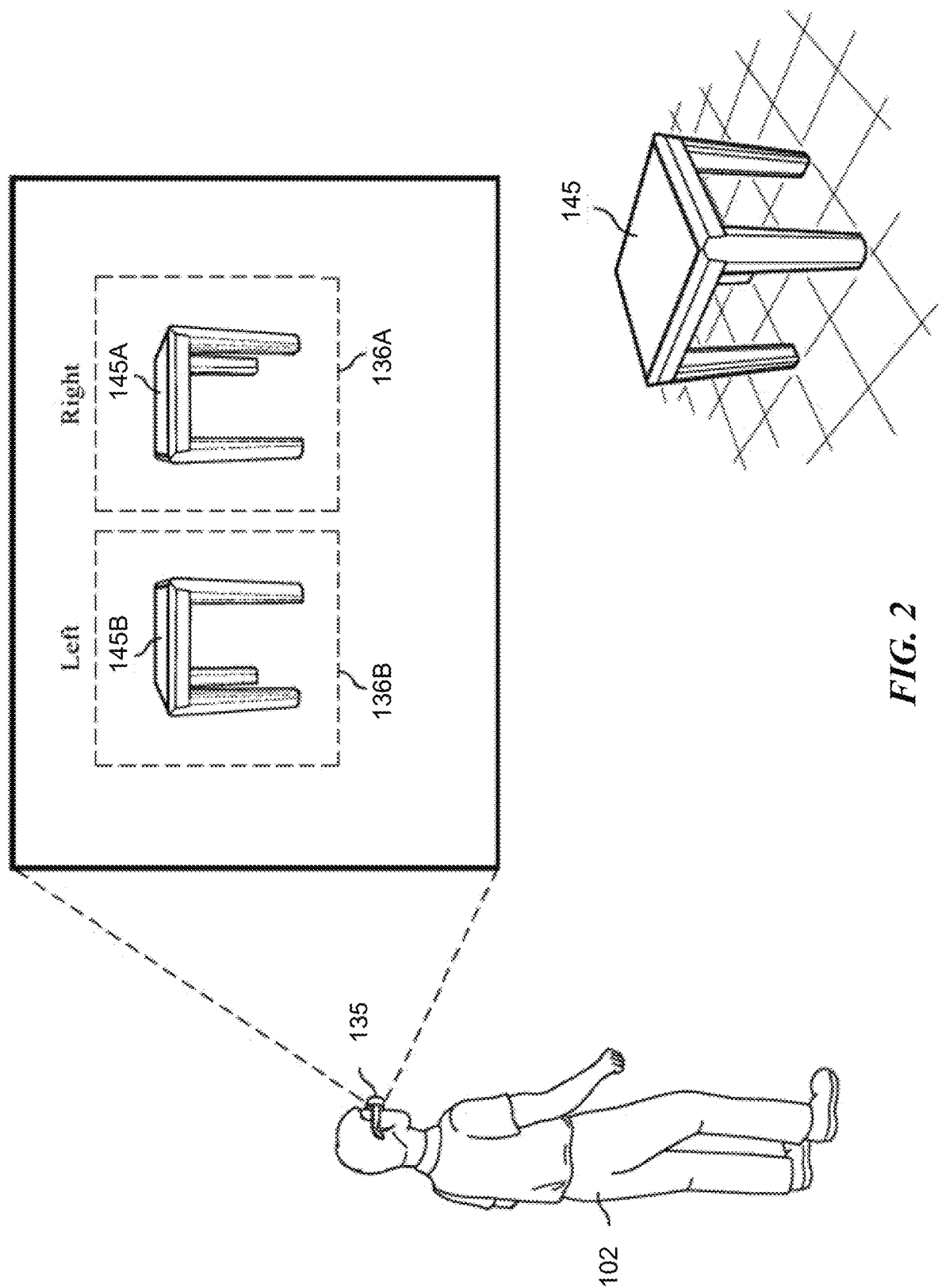
FIG. 2 illustrates an example of a passthrough feature, in accordance with particular embodiments.

FIG. 2 illustrates an example of the passthrough feature. A user 102 may be wearing a VR display device 135, immersed within a virtual reality environment. A real-world object 145 is in the physical environment surrounding the user 102. However, due to the VR display device 135 blocking the vision of the user 102, the user 102 is unable to directly see the real-world object 145. To help the user perceive his physical surroundings while wearing the VR display device 135, the passthrough feature captures information about the physical environment using, for example, one or more cameras 105 such as external-facing cameras 105A-B. The captured information may then be re-projected to the user 102 based on his viewpoints. In particular embodiments where the VR display device 135 has a right display 136A for the user's right eye and a left display 136B for the user's left eye, the virtual reality system 100 may individually render (1) a re-projected view 145A of the physical environment for the right display 135A based on a viewpoint of the user's right eye and (2) a re-projected view 145B of the physical environment for the left display 135B based on a viewpoint of the user's left eye.

Referring again to FIG. 1, the VR display device 135 may have external-facing cameras, such as the two forward-facing cameras 105A and 105B shown in FIG. 1. While only two forward-facing cameras 105A-B are shown, the VR display device 135 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras may be configured to capture the physical environment around the user and may do so continuously to generate a sequence of frames (e.g., as a video). As previously explained, although images captured by the forward-facing cameras 105A-B may be directly displayed to the user 102 via the VR display device 135, doing so may not provide the user with an accurate view of the physical environment since the cameras 105A-B cannot physically be located at the exact same location as the user's eyes. As such, the passthrough feature described herein may use a re-projection technique that generates a 3D representation of the physical environment and then renders images based on the 3D representation from the viewpoints of the user's eyes.

The 3D representation may be generated based on depth measurements of physical objects observed by the cameras 105A-B. Depth may be measured in a variety of ways. In particular embodiments, depth may be computed based on stereo images. As an example and not by way of limitation, the two forward-facing cameras 105A-B may share an overlapping field of view and be configured to capture images simultaneously. As a result, the same physical object may be captured by both cameras 105A-B at the same time.

As an example and not by way of limitation, a particular feature of an object may appear at one pixel pA in the image captured by camera 105A, and the same feature may appear at another pixel pB in the image captured by camera 105B. As long as the depth measurement system knows that the two pixels correspond to the same feature, the virtual reality system 100 could use triangulation techniques to compute the depth of the observed feature. As an example and not by way of limitation, based on the camera 105A's position within a 3D space and the pixel location of pA relative to the camera 105A's field of view, a line could be projected from the camera 105A and through the pixel pA. A similar line could be projected from the other camera 105B and through the pixel pB. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., position and orientation) of the VR display device 135 within the environment may be needed. For example, in order to render the appropriate display for the user 102 while he is moving about in a virtual environment, the virtual reality system 100 may need to determine his position and orientation at any moment. Based on the pose of the VR display device, the virtual reality system 100 may further determine the viewpoint of either of the cameras 105A and 105B or either of the user's eyes. In particular embodiments, the VR display device 135 may be equipped with inertial-measurement units ("IMU"). The data generated by the IMU, along with the stereo imagery captured by the external-facing cameras 105A-B, allow the virtual reality system 100 to compute the pose of the VR display device 135 using, for example, SLAM (simultaneous localization and mapping) or other suitable techniques.

In particular embodiments, the virtual reality system 100 may further have one or more controllers 106 that enable the user 102 to provide inputs. The controller 106 may communicate with the VR display device 135 or a separate one or more computing systems 110 via a wireless or wired connection. The controller 106 may have any number of buttons or other mechanical input mechanisms. In addition, the controller 106 may have an IMU so that the pose of the controller 106 may be tracked. The controller 106 may further be tracked based on predetermined patterns on the controller. As an example and not by way of limitation, the controller 106 may have several infrared LEDs or other known observable features that collectively form a predetermined pattern. Using a sensor or camera, the virtual reality system 100 may be able to capture an image of the predetermined pattern on the controller. Based on the observed orientation of those patterns, the system may compute the controller's position and orientation relative to the sensor or camera.

The virtual reality system 100 may further include a one or more computing systems 110. The one or more computing systems 110 may be a stand-alone unit that is physically separate from the VR display device 135 or the computer system 110 may be integrated with the VR display device 135. In embodiments where the one or more computing systems 110 is a separate unit, the one or more computing systems 110 may be communicatively coupled to the VR display device 135 via a wireless or wired link. The one or more computing systems 110 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by a virtual reality system 100 depends on the capabilities of its one or more computing systems 110.

In embodiments where the one or more computing systems 110 is a high-performance device, an embodiment of the passthrough feature may be designed as follows. Through the external-facing cameras 105A-B of the VR display device 135, a sequence of images of the surrounding physical environment may be captured. The information captured by the cameras 105A-B, however, may be misaligned with what the user's eyes may capture since the cameras could not spatially coincide with the user's eyes (e.g., the cameras may be located some distance away from the user's eyes and, consequently, have different viewpoints). As such, simply displaying what the cameras captured to the user may not be an accurate representation of what the user should perceive.

Instead of simply displaying what was captured, the passthrough feature may re-project information captured by the external-facing cameras 105A-B to the user. Each pair of simultaneously captured stereo images may be used to estimate the depths of observed features. As explained above, to measure depth using triangulation, the one or more computing systems 110 may find correspondences between the stereo images. As an example and not by way of limitation, the one or more computing systems 110 may determine which two pixels in the pair of stereo images correspond to the same observed feature. A high-performance one or more computing systems 110 may solve the correspondence problem using its GPU and optical flow techniques, which are optimized for such tasks. The correspondence information may then be used to compute depths using triangulation techniques. Based on the computed depths of the observed features, the one or more computing systems 110 could determine where those features are located within a 3D space (since the one or more computing systems 110 also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. As an example and not by way of limitation, the system may cast rays into the 3D space from a viewpoint that corresponds to each eye of the user. In this manner, the rendered scene that is displayed to the user may be computed from the perspective of the user's eyes, rather than from the perspective of the external-facing cameras 105A-B.

The process described above, however, may not be feasible for a resource-limited computing unit (e.g., a mobile phone may be the main computational unit for the VR display device). For example, unlike systems with powerful computational resources and ample energy sources, a mobile phone cannot rely on GPUs and computationally expensive algorithms (e.g., optical flow) to perform depth measurements and generate an accurate 3D model of the environment. Thus, to provide passthrough on resource-limited devices, an optimized process is needed.

In particular embodiments, the computing device may be configured to dynamically determine, at runtime, whether it is capable of or able to generate depth measurements using (1) the GPU and optical flow or (2) the optimized technique using video encoder and motion vectors, as described in further detail below. As an example and not by way of limitation, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths.

Figure 3:
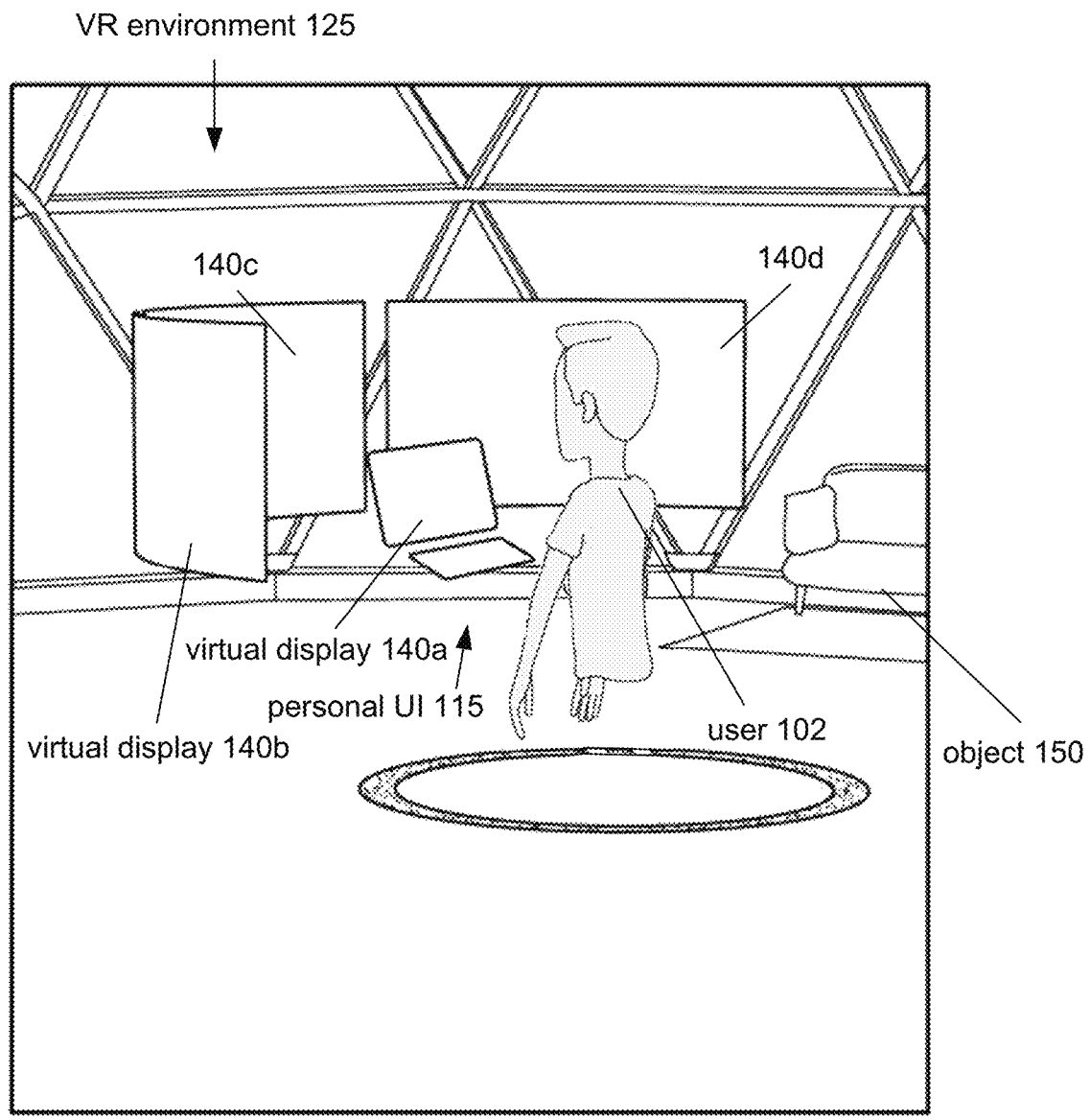
FIG. 3 is an example illustration of a user in a VR environment.

FIG. 3 is an example illustration of a user 102 in a VR environment 125. The user 102 may be wearing a VR display device 135 (not illustrated). The user 102 may be represented by an avatar in the VR environment 125, as illustrated in FIG. 3. Using the VR display device 135, the user may view the VR environment 125 or a passthrough view of the real-world environment. Within the VR environment 125 and the passthrough view of the real-world environment, there may be a personal UI 115 comprising one or more virtual displays 140 (e.g., the virtual displays 140a-d).

Figure 4:
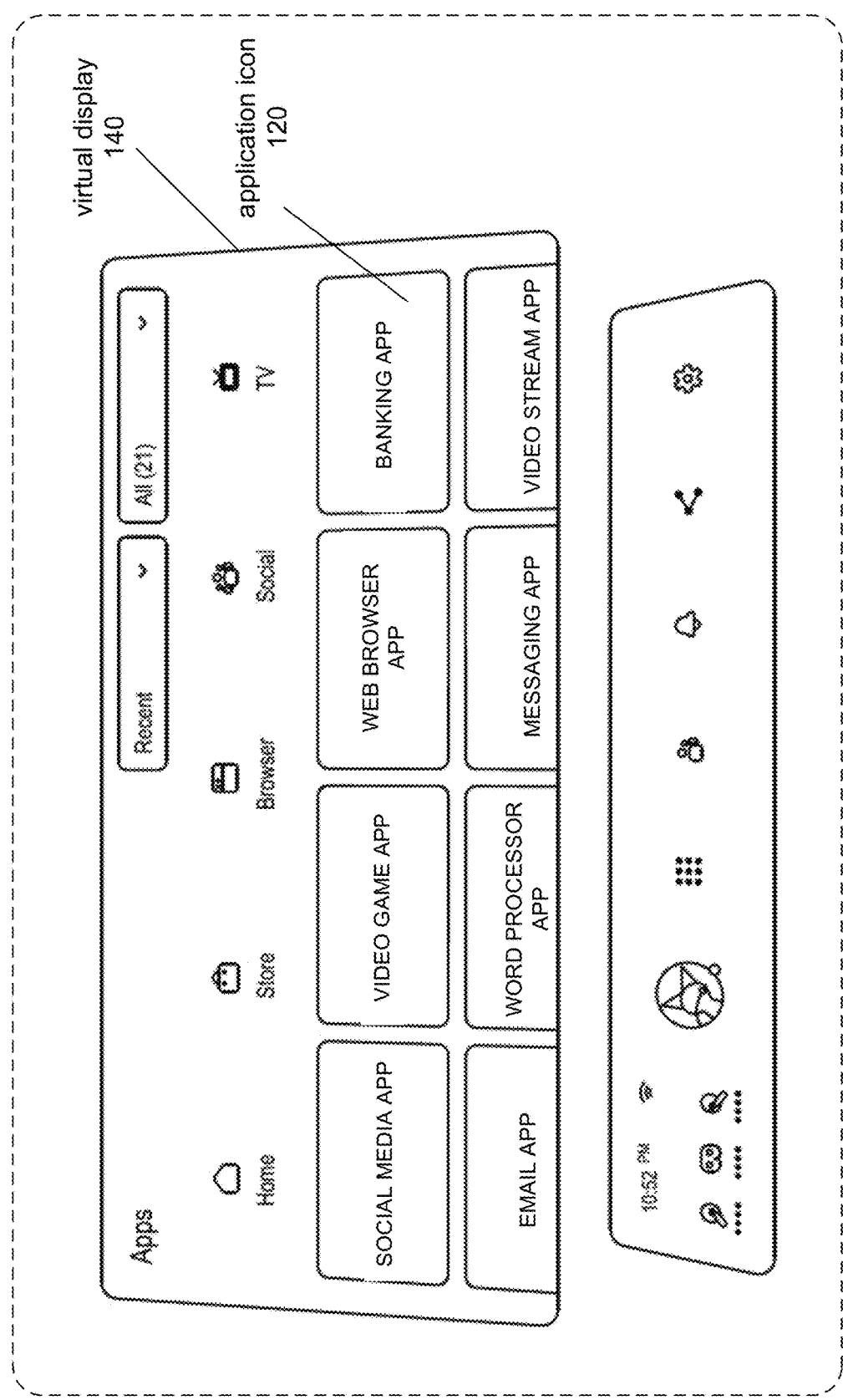
FIG. 4 illustrates an example personal UI.

FIG. 4 illustrates an example personal UI 115. The personal UI 115 may appear as a menu or dashboard for the user to execute one or more tasks, e.g., the user may use the personal UI 115 to execute one or more applications (from among the plurality of applications selectable by application icons 120), such as gaming applications, work applications, entertainment applications, call/chat applications, etc. The personal UI 115 may be a feature of the VR operating system (VROS) associated with the virtual reality system 100. The plurality of applications may correspond to applications accessible on a real-world computing device associated with the user, such as the user's smartphone, tablet, laptop computer, or other computing device. The VROS may have various built-in functionalities. As an example and not by way of limitation, the personal UI 115 of the VROS may provide access to a built-in web browser application and social media application that the user can access. If the user is in a virtual meeting, the user may quickly research a topic on the web browser on the personal UI 115 without having to exit the virtual meeting. If the user is playing a VR video game on a video game application and wants to post their high score, the user may access their social media application from their personal UI 115 and post their high score directly onto their social media, without having to leave the video game application.

Figure 5:
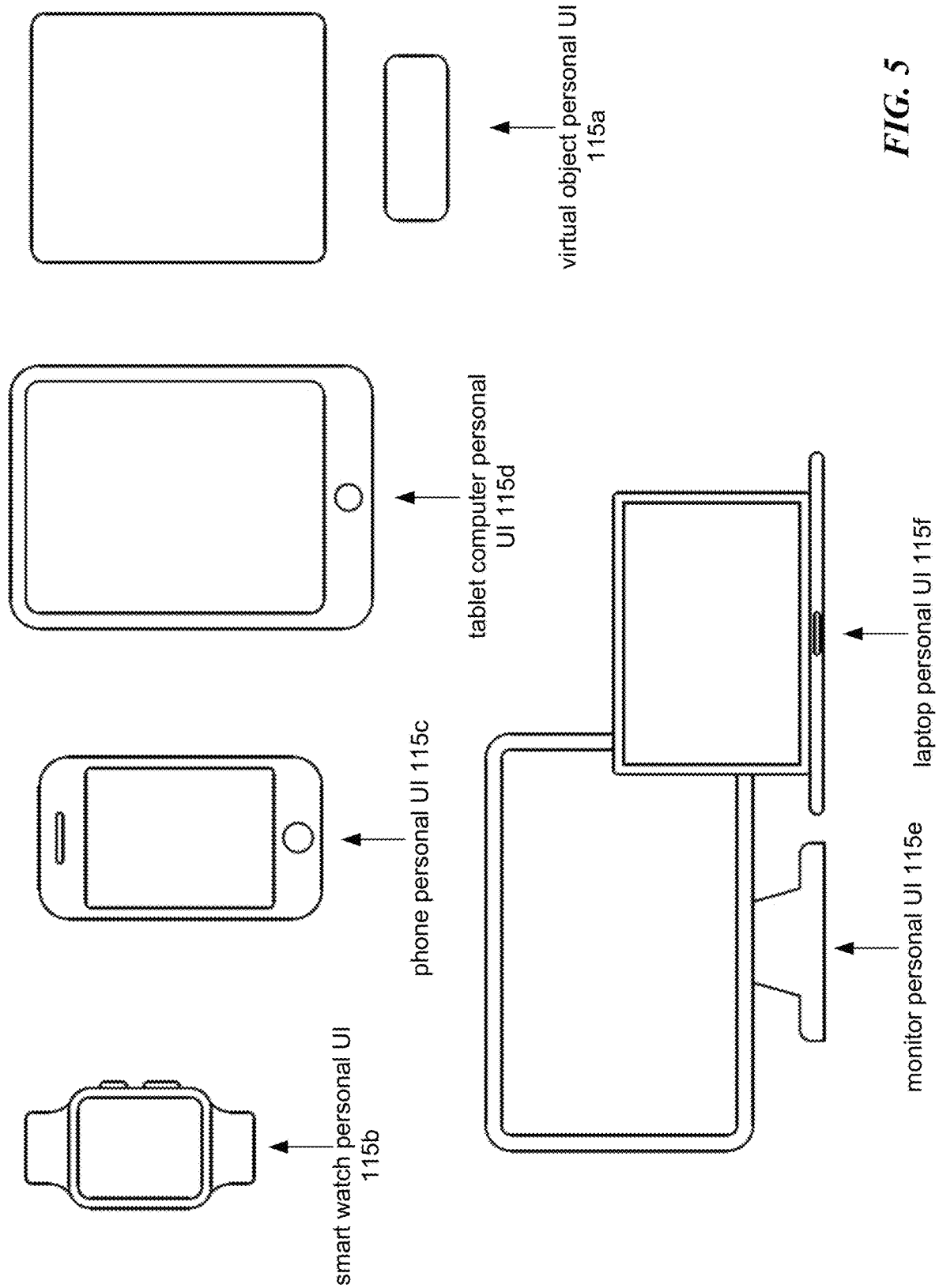
FIG. 5 illustrates example form factors for a personal UI.

FIG. 5 illustrates example form factors for a personal UI 115. The form factors (e.g., the shape, appearance, layout, etc.) of the personal UI 115 may appear as a virtual object personal UI 115a (e.g. a floating 2D screen), or mimic the form factor of real-world objects, such a smart watch personal UI 115b (e.g., appearing on the user's virtual wrist), a phone personal UI 115c, a tablet computer personal UI 115d, a monitor personal UI 115e, a laptop personal UI 115f, a TV screen personal UI (not illustrated), a movie theater screen personal UI (not illustrated), a curved display personal UI (not illustrated), or any other suitable form factor. That is, the form factors of the personal UI may include virtual watches, virtual smartphones, virtual tablets, virtual remote controls, virtual computer monitors, virtual televisions, and virtual movie screens, to name a few. Thus, a technical advantage of the embodiments may include automatically adapting the personal UI 115 in the VR environment 125 to mimic the UI of a real-world object to help a user acclimate to using the personal UI 115.

In particular embodiments, the virtual reality system 100 may render, for one or more displays of a VR display device 135, a first output image of a VR environment 125. The VR environment 125 may comprise a personal UI 115 associated with a first user (e.g., the user 102). The personal UI 115 may have a first form factor (e.g., shape, appearance, layout, etc.) and a first pose (e.g., position and orientation) with respect to the first user. As an example and not by way of limitation, the personal UI 115 may have a form factor of a floating virtual object (e.g., the virtual object personal UI 115a). The personal UI 115 may have a pose that is proximate and in front of the user 102, e.g., in front of the user and in the user's field of view. The personal UI 115 may be a virtual object comprising one or more 2D virtual displays. As an example and not by way of limitation, the personal UI 115 may comprise a smaller virtual display such as the virtual display 140a directly in front of the user 102, as well as one or more other virtual displays 140b-d. The personal UI 115 may be operable to execute a plurality of applications. As an example and not by way of limitation, the personal UI 115 may be operable to access and display various applications, including entertainment related applications (such as streaming services), social media and networking applications, gaming related applications, web browser applications, messaging, call, and video chat applications, work related applications (such as word processing applications), or other suitable applications. Although this disclosure describes rendering a first output image of a VR environment in a particular manner, this disclosure contemplates rendering an output image in any suitable manner.

In particular embodiments, the virtual reality system 100 may detect a change in a context of the first user 102 with respect to the VR environment 125. A technical challenge may include detecting when a user's context has changed. The solution presented by the embodiments disclosed herein to address this challenge may be to determine a change in the pose of the user 102 with respect to the VR environment 125 and/or objects within the VR environment 125, receive an input by the user 102 selecting an application that is associated with a change in the form factor and/or pose of the personal UI 115, or detect a change from one application to another. Detecting the change in the context of the first user 102 may include determining the first user 102 has changed from a first pose to a second pose in the VR environment 125. The virtual reality system 100 may detect a change in the pose of the user 102 using one or more sensors (such as position sensors, cameras 105, accelerometers, etc.). The user 102 may change their pose if they rotate around their spot or move to another spot in the VR environment 125. As an example and not by way of limitation, a first pose of the user 102 may be the user 102 standing in the middle of a room (e.g., in the middle of the room in the VR environment 125). A second pose of the user 102 may be the user 102 moving to a couch or a desk (e.g., the object 150) and sitting on the couch or sitting at the desk.

In particular embodiments, determining the first user 102 has changed from the first pose to the second pose may include the virtual reality system 100 determining whether a location of the user 102 is within a threshold distance of an object 150 in the VR environment 125, and determining whether an orientation of the user 102 indicates the user is facing the object 150 in the VR environment 125. The virtual reality system 100 may determine whether a location of the user 102 is within a threshold distance of an object 150 in the VR environment 125 using one or more sensors (such as position sensors, cameras 105, accelerometers, object detection filters, etc.) of the virtual reality system 100. The object 150 may be a VR object in the VR environment 125. The object 150 may be a mixed-reality (MR) object in the VR environment 125 may correspond to a real-world object in the real-world environment. As an example and not by way of limitation, the virtual reality system 100 may determine whether the user 102 has moved towards a couch, and further determine whether the user 102 has approached within a threshold distance of the couch (e.g., whether the user 102 has approached within 1 meter of the couch). The virtual reality system 100 may determine whether an orientation of the user 102 indicates the user 102 is facing the object in the VR environment 125 using one or more sensors (such as position sensors, cameras 105, accelerometers, object detection filters, etc.) of the virtual reality system 100. As an example and not by way of limitation, the virtual reality system 100 may determine whether the user 102 is facing the couch (e.g., the couch is within the user's field of view) or facing away. Then, if the virtual reality system 100 determines the user 102 is within the threshold distance of the object, and the user 102 is facing the object, the virtual reality system 100 may detect the user 102 has changed from a first pose to a second pose in the VR environment 125.

In particular embodiments, detecting the change in the context of the first user may include the virtual reality system 100 receiving an input by the user selecting a particular application on the personal UI 115 from the plurality of applications. As an example and not by way of limitation, the user 102 may use the personal UI 115 to select an application or switch between different applications by clicking an icon, button, switch, or other form of input on the personal UI 115. The virtual reality system 100 may then receive an indication the user 102 intends to select a particular application on the personal UI 115. The particular application may be associated with the second form factor and the second pose of the personal UI 115. The personal UI 115 may have a predetermined form factor and pose, preferred form factor and pose, or may otherwise be associated with a specific form factor and pose to enhance the user's VR experience by determining the form factor and pose of the personal UI that will least detract from the user's VR experience (e.g., determining the least view obstructive form factor and pose of the personal UI 115) and/or best enhance the user's VR experience (e.g., determining the most productive form factor and pose of the personal UI 115). As an example and not by way of limitation, if the virtual reality system 100 is executing a first application such as a word processing application, the first form factor of the personal UI 115 may be a multi-monitor setup to enable the user 102 to do work as the user may in an office setting, and the pose of the personal UI 115 may have the virtual monitors displayed proximate to and in front of the user. If the virtual reality system 100 switches to execute a second application such as a video streaming application, the form factor of the personal UI 115 may be a large virtual TV or movie theater screen, and the pose of the personal UI may have the virtual TV or movie theater screen placed further away from the user (mimicking the pose of a real-world TV or movie theater screen relative to a real-world user).

Figure 6:
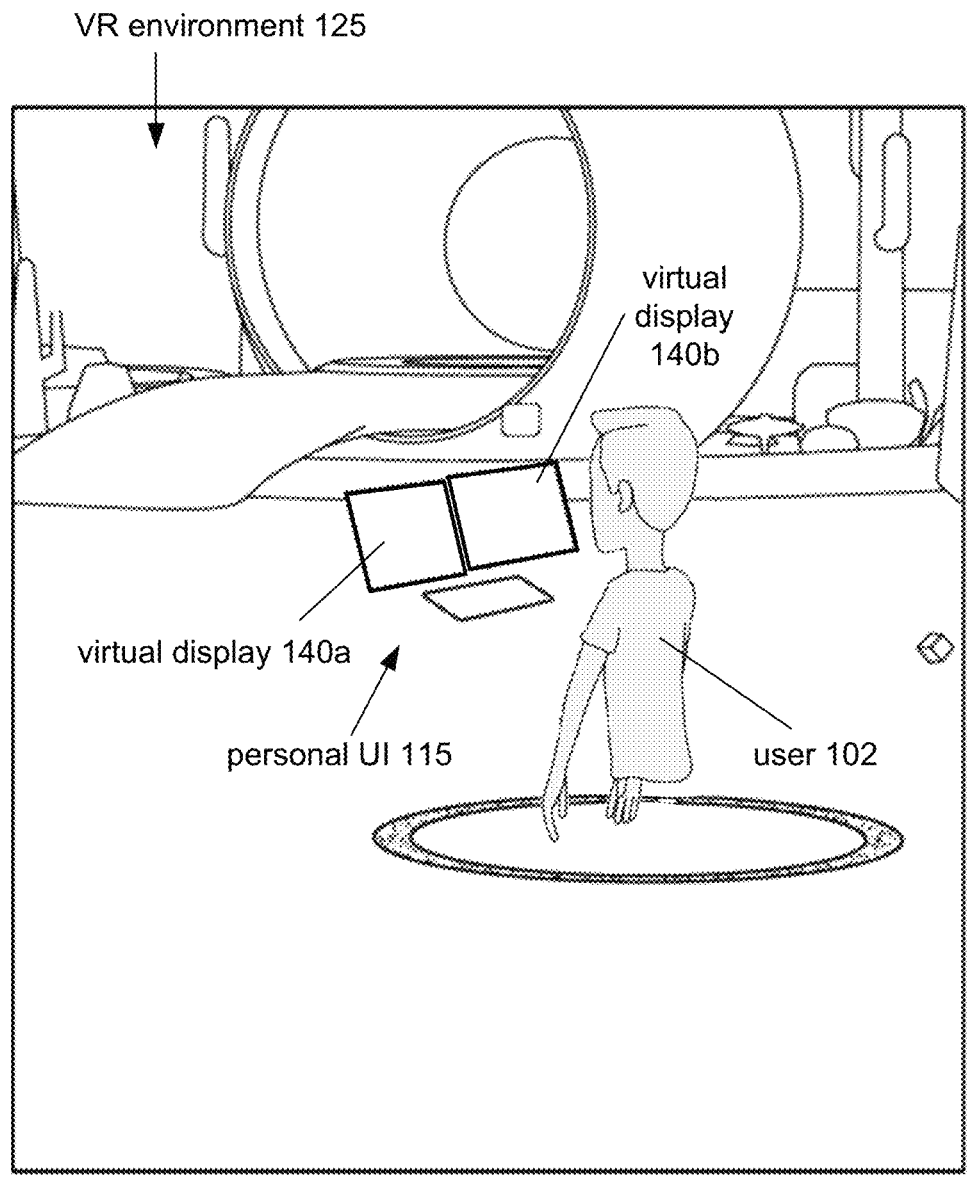
FIG. 6 illustrates an example of a user in a VR environment.

FIG. 6 illustrates an example of a user 102 in a VR environment 125. The user 102 may be represented by an avatar in the VR environment 125, as illustrated in FIG. 6. The VR environment 125 in FIG. 6 may be a new or different VR environment than the VR environment 125 in FIG. 3. In particular embodiments, detecting the change in the context of the first user may include detecting the first user has moved from a first virtual space to a second virtual space. As an example and not by way of limitation, if the user was in a first VR space that was a VR office space, and the user selects a video streaming application on the personal UI 115, the second VR space may be a VR TV or movie theater screen. As another example, if the user selects a gaming application, the second VR space may be a gaming VR space (such as "inside" a video game environment or landscape, or at a desk setup that includes a virtual widescreen monitor that is geared for a gaming experience). As another example, if the user selects a map or travel application, the second VR space may be a VR environment 125 that puts the user in a new location. As an example and not by way of limitation, if the user selects a "tour of Paris" application, the VR space may be a rendering of the Eiffel Tower and its surroundings in Paris. Based on these example changes, the virtual reality system 100 may then detect the user has switched from a first virtual space to a second virtual space. Although this disclosure describes detecting a change in context in particular manners, this disclosure contemplates detecting a change in context in any suitable manner.

In particular embodiments, detecting the change in the context of the first user may include the virtual reality system 100 detecting the first user has switched from using a first application to a second application on the personal UI 115. The virtual space (e.g., the VR environment 125) may be a result of the user switching between applications. As an example and not by way of limitation, if the user was using a work-related application (such as a word processing application), the user may have been in a first VR space that may be an office VR space. If the user then selects a video streaming application, the second VR space may be a VR movie theater. As another example and not by way of limitation, if the user selects a gaming application, the second VR space may be a gaming VR space (such as "inside" a video game, or at a desk setup includes a virtual widescreen monitor that is geared for a gaming experience). As another example, if the user selects a map or travel application, the second VR space may be a VR environment 125 that puts the user in a new location. As an example and not by way of limitation, if the user selects a "tour of Paris" application, the VR space may be a rendering of the Eiffel Tower and its surroundings in Paris.

One technical challenge may include maintaining personal UI 115 functionalities without view obstructing or disrupting the VR environment 125. The solution presented by the embodiments disclosed herein to address this challenge may be to adapt the personal UI 115 based on the context of the user 102 with respect to the VR environment 125. In particular embodiments, the virtual reality system 100 may determine whether to adapt the personal UI 115 based on the detected change in the context of the first user 102. Based on the detected change in the context of the user 102 with respect to the VR environment 125 (e.g., whether the user 102 has changed from a first pose to a second pose, whether the user selected a particular application that is associated with a form factor and a pose of the personal UI 115, whether the user 102 has moved from a first virtual space to a second virtual space, whether the user switched from a first application to a second application on the personal UI 115, etc.), the personal UI 115 may adapt to a new form factor and/or pose with respect to the user 102 in the VR environment 125. As an example and not by way of limitation, if the user 102 has changed from a first pose to a second pose, the virtual reality system 100 may adapt the personal UI 115 to the user's second pose (e.g., if the user 102 was standing and then sits down, the form factor and the pose of the personal UI 115 may be adapted to change its appearance, position, and orientation to keep the personal UI 115 in the field of view of the user 102). As another example and not by way of limitation, if the user 102 selected a particular application that is associated with a form factor and a pose of the personal UI 115, the virtual reality system 100 may determine the form factor and the pose of the personal UI 115 should adapt to the preferred form factor and pose of the personal UI, or the form factor and pose that is associated with the particular application. As an example and not by way of limitation, if the user selects a video streaming application, the virtual reality system 100 may choose to adapt the form factor and the pose of the personal UI 115 to mimic a real-world movie theater screen. As another example and not by way of limitation, if the user moves from one virtual space to another virtual space (e.g., from a work VR setting to a movie theater VR setting), the virtual reality system 100 may determine the personal UI 115 should adapt from a work VR setting (e.g., a dual monitor virtual display) to an entertainment VR setting (e.g., a virtual movie theater screen). As another example and not by way of limitation, if the user switches from a first application to a second application, the virtual reality system 100 may adapt the personal UI 115 to a form factor and pose that best suits the user 102 (e.g., the user's wants and needs) and/or the second application. As an example and not by way of limitation, if the user 102 switches from a work-related application to a travel-related application, the form factor and pose of the personal UI 115 may change from a form factor and pose more suited for a work setting (e.g., large dual-monitor virtual displays) to a form factor and pose more suited for a travel setting (e.g., a smaller smartphone or tablet computer virtual display that is less view obstructive for sightseeing). As another example and not by way of limitation, the personal UI 115 may be used to run a 2D application in a 3D VR environment 125. If the user wants to watch a movie, the user may cast the movie from the 2D virtual streaming application onto a virtual TV screen in a 3D VR environment 125. Although this disclosure describes detecting a change in a context in a particular manner, this disclosure contemplates detecting a change in a context in any suitable manner.

In particular embodiments, determining whether to adapt the personal UI 115 based on the detected change in the context of the first user 102 includes identifying a predetermined form factor and pose of the personal UI 115 associated with an activity of the user in the VR environment 125. That is, there may be a form factor and pose of the personal UI 115 that is predetermined based on the activity or application currently being executed by the virtual reality system 100. The predetermined form factor and pose of the personal UI 115 may be based on the form factor and pose of the personal UI that is the least view obstructive and/or the most productive form factor and pose of the personal UI 115, based on the activity currently being undertaken by the user 102. As an example and not by way of limitation, if the user 102 is in a virtual conference room or lecture hall, the form factor and pose of the personal UI 115 may be a view unobstructive virtual laptop directly in front of the user 102 for taking notes. As another example, if the user 102 is on a city tour or is in a virtual hangout room with another user, the form factor and pose of the personal UI 115 may take on the appearance of a view unobstructive virtual smartphone or tablet. As another example, if the user is in a work VR environment 125, the form factor and pose of the personal UI 115 may take on the appearance and layout of a virtual multi-monitor setup that enables the user 102 to work efficiently and productively. As another example, if the user 102 is in an entertainment VR setting (e.g., watching a movie), the form factor and pose of the personal UI 115 may appear as a large virtual movie screen that appears to be far away from the user 102 (mimicking a real-world movie theater experience). Although this disclosure describes identifying a predetermined form factor and pose of a personal UI 115 in a particular manner, this disclosure contemplates determining a form factor and pose of a UI in any suitable manner.

In particular embodiments, the virtual reality system 100 may render, for the one or more displays of the VR display device 135, a second output image of the VR environment 125. The personal UI 115 may be adapted to have a second form factor and a second pose with respect to the first user 102 responsive to determining to adapt the personal UI 115 based on the detected change in the context of the first user 102. As an example and not by way of limitation and as seen in FIG. 3, a first output image of the VR environment 125 has a personal UI 115 that includes multiple larger virtual displays. In FIG. 6, when the context of the user 102 with respect to the VR environment 125 has changed, the second output image of the VR environment 125 has a personal UI 115 that is adapted to the changed context. The personal UI 115 has a smaller, less view obstructive form factor and pose of the personal UI 115, which may allow the user to explore the new VR environment 125 without having the larger, view obstructive displays 140 in the user's view (e.g., the virtual displays 140a-b in FIG. 6 may be fewer in number and/or smaller than the virtual displays 140a-d in FIG. 3). As an example and not by way of limitation, if the user 102 is in a setting where it is important to be able to view the VR environment 125 (e.g., the user may be virtually sightseeing or travelling), the personal UI 115 may be adapted to have a smaller form factor (e.g., a smartwatch or smartphone form factor) and less view obstructive pose (e.g., a smartwatch on the user's virtual wrist or smartphone in the user's virtual hand) to allow the user 102 to explore their virtual surroundings. Thus, a technical advantage of the embodiments may include automatically adapting a form factor and a pose of the personal UI 115 responsive to a detected change in the context of the user 102 with respect to the VR environment 125. Although this disclosure describes rendering a second output image of a VR environment 125 in a particular manner, this disclosure contemplates rendering an output image in any suitable manner.

Figure 7:
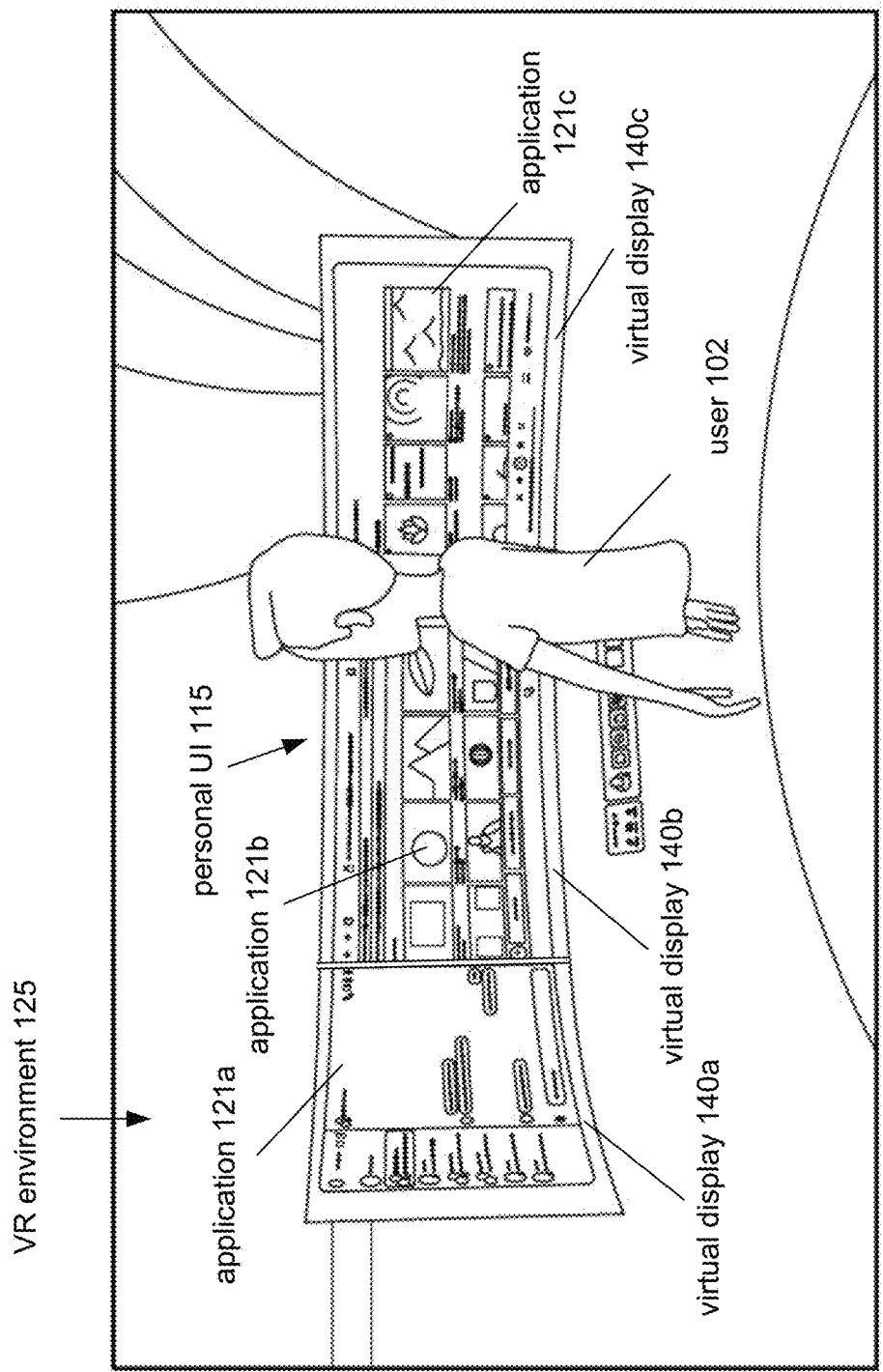
FIG. 7 illustrates an example view of an arrangement of virtual displays for a personal UI.

FIG. 7 illustrates an example view of an arrangement of virtual displays 140 for a personal UI 115. In particular embodiments, the personal UI 115 may comprise a plurality of 2D virtual displays 140. The plurality of 2D virtual displays 140 may be arranged in a tile-based layout comprising a plurality of preset orientations for the plurality of 2D virtual displays 140. That is, the plurality of 2D virtual displays may be arranged so that each virtual display 140 may "snap" to a position (i.e., automatically jump to a predetermined position when the user drags it to the proximity of the desired location). This may enable the user 102 (illustrated as a VR rendering of the user, e.g., an avatar of the user) to easily and efficiently arrange the plurality of virtual displays 140. As an example and not by way of limitation, the user 102 may arrange each virtual display 140 side-by-side next to one another, above or below one another, etc. The tile-based layout may prevent the plurality of virtual displays 140 from overlapping one another, e.g., having one virtual display 140 obstruct the view of another virtual display 140. Additionally, the user may adjust the virtual display 140 to "stretch" or extend the display to cover more than one tile of the tile-based layout. The user may adjust the virtual displays 140 in the tile-based system by dragging, adding, removing, or otherwise altering the layout of the virtual displays 140. Although this disclosure describes arranging virtual displays 140 in a particular manner, this disclosure contemplates arranging virtual displays in any suitable manner.

In particular embodiments, a first 2D virtual display 140 of the plurality of 2D virtual displays 140 may be operable to execute a first set of applications of the plurality of applications. A second 2D virtual display 140 of the plurality of 2D virtual displays 140 may be operable to execute a second set of applications of the plurality of applications. As an example and not by way of limitation, a first virtual display 140a may be operable to run a first application 121a, a second virtual display 140b may be operable to run a second application 121b, a third virtual display 140c may be operable to run a third application 121c, and etc. The applications 121 may be selected using the one or more application icons 120 of the personal UI 115 (see FIG. 4). Each virtual display 140 may be able to execute applications 121 independently of one another. As an example and not by way of limitation, a first virtual display 140a may be able to display a messaging application (e.g., an application 121a), while a second virtual display 140b may be able to operate a gaming application (e.g., an application 121b), and while a third virtual display 140c may be able to operate a photo-editing application (e.g., an application 121c). The virtual displays may operate these separate applications (e.g., applications 121a-c) side-by-side on the virtual displays (e.g., virtual displays 140a-c) the personal UI 115. Although this disclosure describes executing a plurality of applications on virtual displays in a particular manner, this disclosure contemplates executing applications on virtual displays in any suitable manner.

FIG. 8A illustrates an example of a first user 102 using a real-world computing device 117 (e.g., a tablet computer) having a real-world computing device UI 118 in a real-world environment 130. FIG. 8A is in the perspective of the first user 102. As an example and not by way of limitation, the first user 102 may be inside their own home and the VR display device 135 may display a passthrough view of the user's real-world environment 130. FIG. 8B illustrates an example of a personal UI 115 for a first user 102 in a VR environment 125. FIG. 8B is in the perspective of the first user 102. As an example and not by way of limitation, the VR display device 135 may display a rendered VR environment 125 where the first user 102 is at a virtual park.

Figure 9:
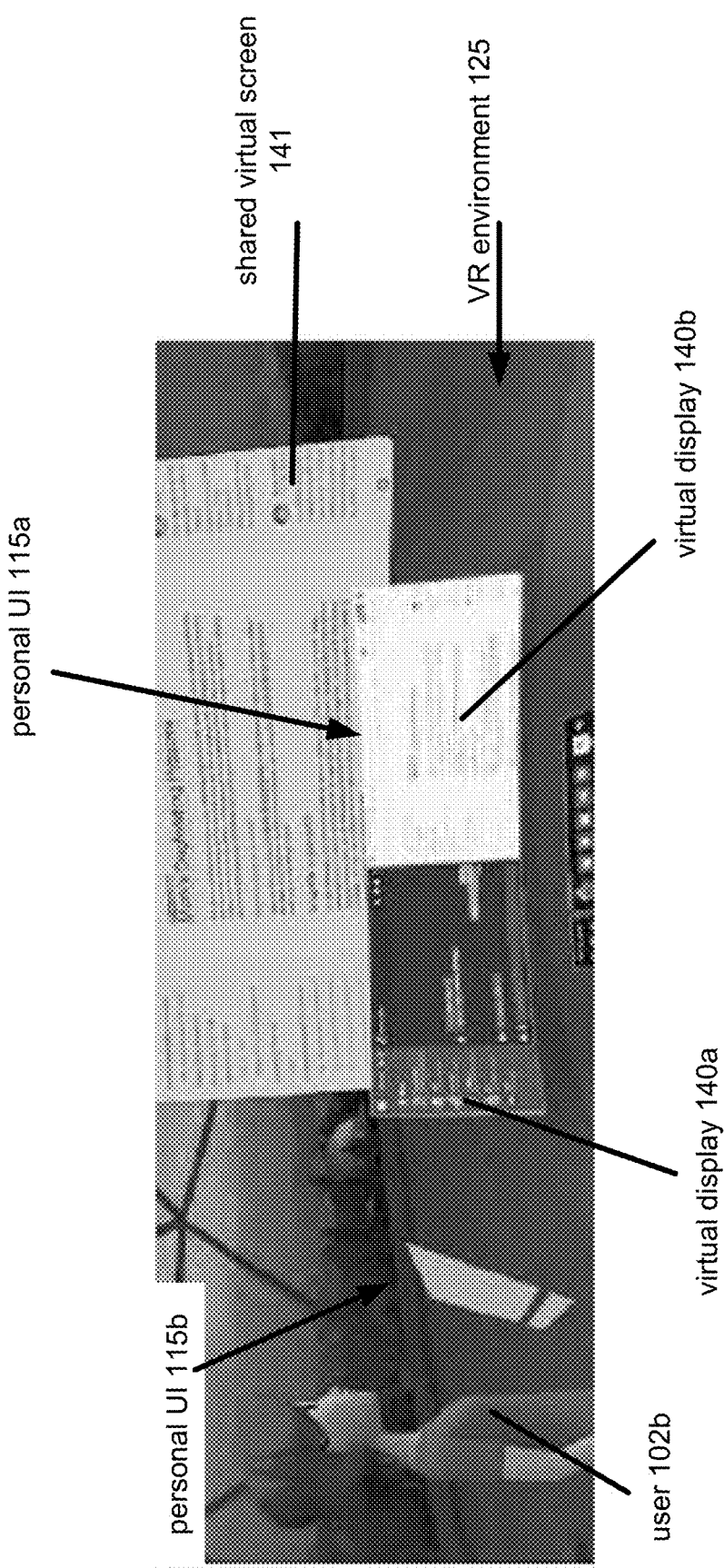
FIG. 9 illustrates an example of casting content onto a shared virtual screen in a VR environment.

FIG. 9 illustrates an example of casting content onto a shared virtual screen 141 in a VR environment 125. FIG. 9 is in the perspective of a first user 102a. The VR display device 135 may display a rendered VR environment 125 where the first user 102a is in a shared virtual space with a second user 102b. In particular embodiments, the virtual reality system 100 may cast content from the personal UI 115a of the first user 102a onto a shared virtual display such as the shared virtual screen 141 in the VR environment 125. The shared virtual screen 141 may be viewable by the first user 102a and the one or more second users 102b, and the content projected or displayed on the shared virtual screen 141 may be viewable by the first user 102a and the one or more second users 102b. While casting content from the personal UI 115a of the first user 102a onto a shared virtual screen to be viewed by the first user 102a and the one or more second users 102b, the information and content on the personal UI 115a of the first user 102a may remain hidden or blocked to the one or more second users 102b. The form factor of the shared virtual screen 141 may be the same relative to the first user 102a and the second user 102b in the VR environment 125. The pose of the shared virtual screen 141 may be the same relative to the first user 102a and relative to the second user 102b in the VR environment 125. The pose of the shared virtual screen 141 may be the same relative to the VR environment 125 (e.g., the first user 102a and the second user 102b may find the shared virtual screen 141 in the same corner of the VR environment 125). Although this disclosure describes casting content in a particular manner, this disclosure contemplates casting content in any suitable manner.

In particular embodiments, the VR environment 125 may comprise a shared virtual space for the first user 102a and one or more second users 102b, e.g., a virtual environment 125 for the first user 102a and the one or more second users 102b. The first user 102a and the one or more second users 102b may meet and interact in the shared virtual space such as the VR environment 125 illustrated in FIG. 9. The first user 102a and the one or more second users 102b may meet in a shared virtual space that is based on a real-world place (e.g., a real-world park) or a fictional space (e.g., an alien planet rendered in the VR environment 125). The first user 102a and the one or more second users 102b may interact with one another in the shared virtual space. As an example and not by way of limitation, if the first user 102a receives a video call from the second user 102b, the first user 102a and the second user 102b may enter a virtual meeting room and talking "face to face" instead of talking to one another through a 2D display of the video call application. As another example and not by way of limitation, the first user 102a and the one or more second users 102b may interact with one another and play a game of virtual tennis in the shared virtual space (e.g., where the users may use the controller 106 as tennis rackets). Although this disclosure describes users meeting in a shared virtual space in a particular manner, this disclosure contemplates users meeting in a shared virtual space in any suitable manner.

In particular embodiments, privacy settings of the first user 102a may prevent the one or more second users from viewing content on the personal UI 115a associated with the first user 102a. Similarly, privacy settings of the one or more second users 102b may prevent the first user 102a from viewing content on the personal UI 115b associated with the one or more second users 102b. The personal UI 115 of other users may appear as a floating blank object that is devoid of information or content (as illustrated in FIG. 9 where the personal UI 115b of the second user 102b appears as a floating object devoid of any information or content). As an example and not by way of limitation, the second user 102b will not be able to see documents and photos that are displayed on the personal UI 115a of the first user 102a. That is, the form factor and pose of another user's personal UI 115 may appear as a standard form factor and pose. That is, if the personal UI 115a of the first user 102a has a form factor of a large TV screen and a pose that is far away from the first user 102a, the second user 102b may only see the personal UI 115a of the first user 102a as a blank floating object that has a standard form factor and a pose that is proximate to the first user 102a. Privacy settings may be adjusted to allow other users to view items of information or content on another user's personal UI 115. Although this disclosure describes utilizing privacy settings in a particular manner, this disclosure contemplates privacy settings in any suitable manner.

Figure 10:
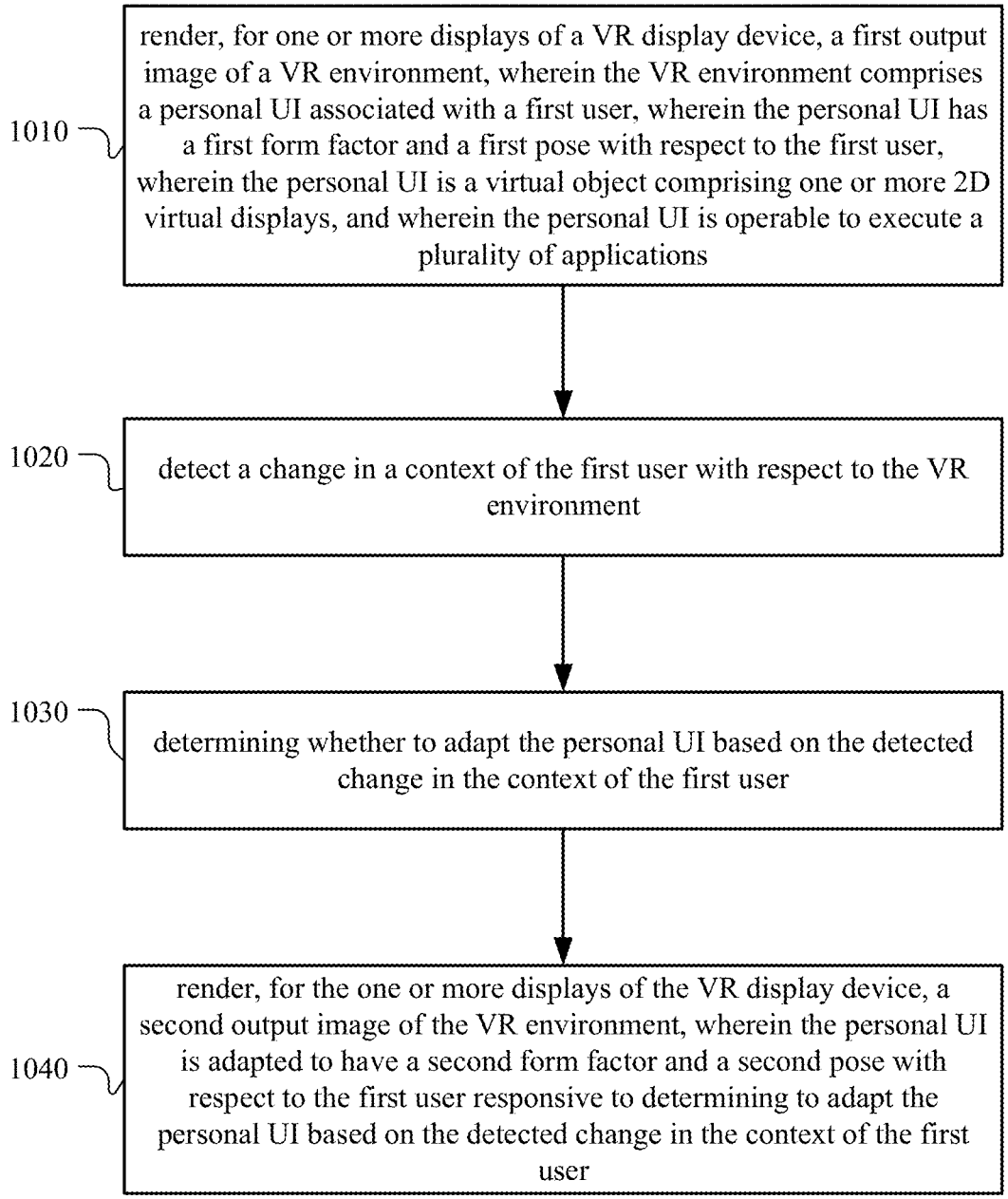
FIG. 10 illustrates an example method for rendering a personal UI in a VR environment.

FIG. 10 illustrates an example method 1000 for rendering a personal UI in a VR environment. The method may begin at step 1010, where one or more computing systems may render, for one or more displays of a VR display device, a first output image of a VR environment. The VR environment may comprise a personal UI associated with a first user. The personal UI may have a first form factor and a first pose with respect to the first user. The personal UI may be a virtual object comprising one or more 2D virtual displays. The personal UI may be operable to execute a plurality of applications. At step 1020, the one or more computing systems may detect a change in a context of the first user with respect to the VR environment. At step 1030, the one or more computing systems may determine whether to adapt the personal UI based on the detected change in the context of the first user. At step 1040, the one or more computing systems may render, for the one or more displays of the VR display device, a second output image of the VR environment. The personal UI may be adapted to have a second form factor and a second pose with respect to the first user responsive to determining to adapt the personal UI based on the detected change in the context of the first user. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method 1000 for rendering a personal UI in a VR environment including the particular steps of the method of FIG. 10, this disclosure contemplates any suitable method for rendering a personal UI in a VR environment including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
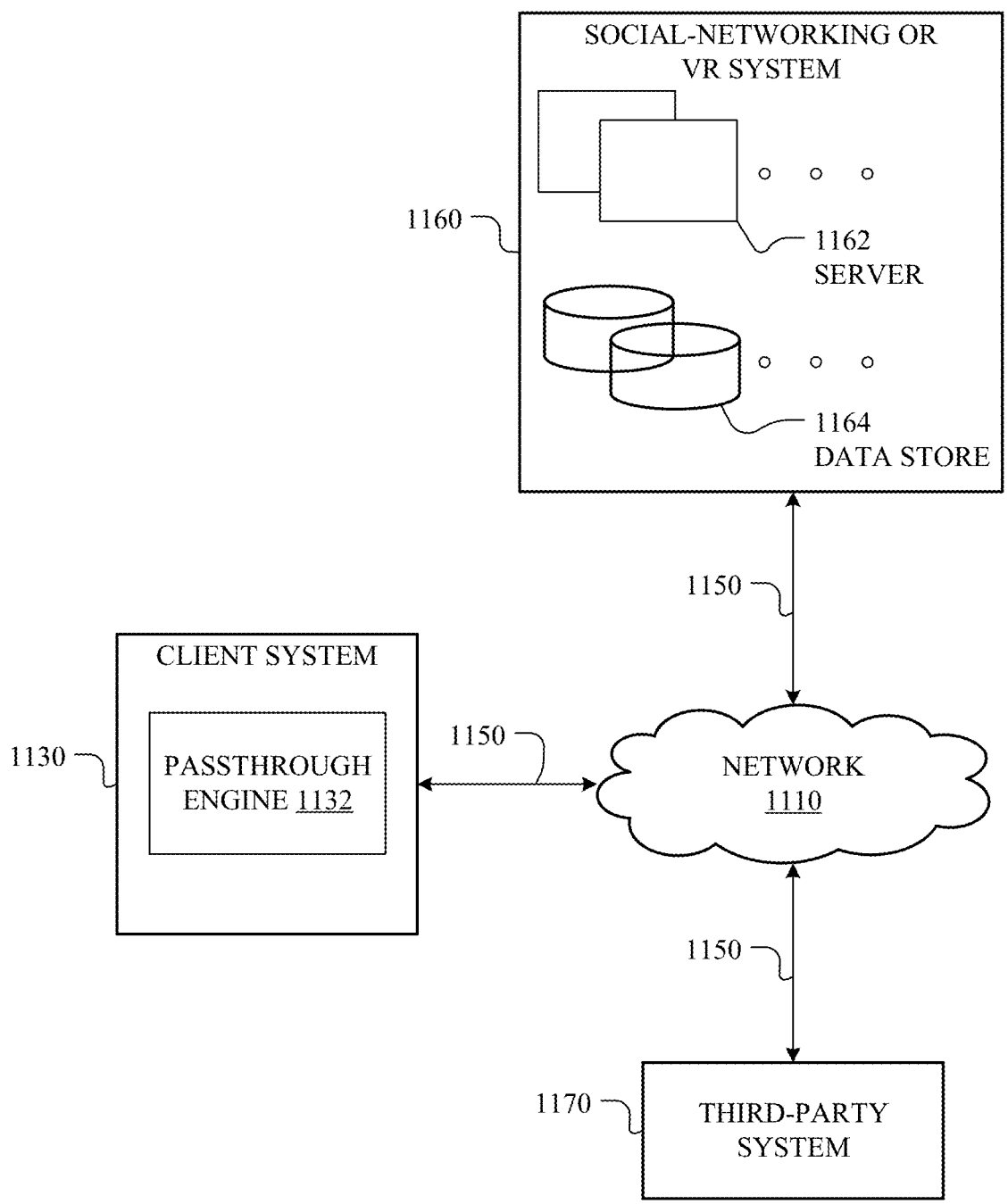
FIG. 11 illustrates an example network environment associated with a social-networking system.

FIG. 11 illustrates an example network environment 1100 associated with a VR or social-networking system. Network environment 1100 includes a client system 1130, a VR or social-networking system 1160, and a third-party system 1170 connected to each other by a network 1110. Although FIG. 11 illustrates a particular arrangement of client system 1130, VR or social-networking system 1160, third-party system 1170, and network 1110, this disclosure contemplates any suitable arrangement of client system 1130, VR or social-networking system 1160, third-party system 1170, and network 1110. As an example and not by way of limitation, two or more of client system 1130, VR or social-networking system 1160, and third-party system 1170 may be connected to each other directly, bypassing network 1110. As another example, two or more of client system 1130, VR or social-networking system 1160, and third-party system 1170 may be physically or logically co-located with each other in whole or in part. Moreover, although FIG. 11 illustrates a particular number of client systems 1130, VR or social-networking systems 1160, third-party systems 1170, and networks 1110, this disclosure contemplates any suitable number of client systems 1130, VR or social-networking systems 1160, third-party systems 1170, and networks 1110. As an example and not by way of limitation, network environment 1100 may include multiple client system 1130, VR or social-networking systems 1160, third-party systems 1170, and networks 1110.

This disclosure contemplates any suitable network 1110. As an example and not by way of limitation, one or more portions of network 1110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1110 may include one or more networks 1110.

Links 1150 may connect client system 1130, social-networking system 1160, and third-party system 1170 to communication network 1110 or to each other. This disclosure contemplates any suitable links 1150. In particular embodiments, one or more links 1150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1150, or a combination of two or more such links 1150. Links 1150 need not necessarily be the same throughout network environment 1100. One or more first links 1150 may differ in one or more respects from one or more second links 1150.

In particular embodiments, client system 1130 may be an electronic device including hardware, software, or embedded logic components or a combination of two or more such components and capable of carrying out the appropriate functionalities implemented or supported by client system 1130. As an example and not by way of limitation, a client system 1130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1130. A client system 1130 may enable a network user at client system 1130 to access network 1110. A client system 1130 may enable its user to communicate with other users at other client systems 1130.

In particular embodiments, client system 1130 (e.g., an HMD) may include a passthrough engine 1132 to provide the passthrough feature described herein, and may have one or more add-ons, plug-ins, or other extensions. A user at client system 1130 may connect to a particular server (such as server 1162, or a server associated with a third-party system 1170). The server may accept the request and communicate with the client system 1130.

In particular embodiments, VR or social-networking system 1160 may be a network-addressable computing system that may host an online Virtual Reality environment or social network. VR or social-networking system 1160 may generate, store, receive, and send social-networking data, such as, for example, user-profile data, concept-profile data, social-graph information, or other suitable data related to the online social network. Social-networking or VR system 1160 may be accessed by the other components of network environment 1100 either directly or via network 1110. As an example and not by way of limitation, client system 1130 may access social-networking or VR system 1160 using a web browser, or a native application associated with social-networking or VR system 1160 (e.g., a mobile social-networking application, a messaging application, another suitable application, or any combination thereof) either directly or via network 1110. In particular embodiments, social-networking or VR system 1160 may include one or more servers 1162. Each server 1162 may be a unitary server or a distributed server spanning multiple computers or multiple datacenters. Servers 1162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1162 may include hardware, software, or embedded logic components or a combination of two or more such components for carrying out the appropriate functionalities implemented or supported by server 1162. In particular embodiments, social-networking or VR system 1160 may include one or more data stores 1164. Data stores 1164 may be used to store various types of information. In particular embodiments, the information stored in data stores 1164 may be organized according to specific data structures. In particular embodiments, each data store 1164 may be a relational, columnar, correlation, or other suitable database. Although this disclosure describes or illustrates particular types of databases, this disclosure contemplates any suitable types of databases. Particular embodiments may provide interfaces that enable a client system 1130, a social-networking or VR system 1160, or a third-party system 1170 to manage, retrieve, modify, add, or delete, the information stored in data store 1164.

In particular embodiments, social-networking or VR system 1160 may store one or more social graphs in one or more data stores 1164. In particular embodiments, a social graph may include multiple nodes—which may include multiple user nodes (each corresponding to a particular user) or multiple concept nodes (each corresponding to a particular concept)—and multiple edges connecting the nodes. Social-networking or VR system 1160 may provide users of the online social network the ability to communicate and interact with other users. In particular embodiments, users may join the online social network via social-networking or VR system 1160 and then add connections (e.g., relationships) to a number of other users of social-networking or VR system 1160 to whom they want to be connected. Herein, the term "friend" may refer to any other user of social-networking or VR system 1160 with whom a user has formed a connection, association, or relationship via social-networking or VR system 1160.

In particular embodiments, social-networking or VR system 1160 may provide users with the ability to take actions on various types of items or objects, supported by social-networking or VR system 1160. As an example and not by way of limitation, the items and objects may include groups or social networks to which users of social-networking or VR system 1160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or VR system 1160 or by an external system of third-party system 1170, which is separate from social-networking or VR system 1160 and coupled to social-networking or VR system 1160 via a network 1110.

In particular embodiments, social-networking or VR system 1160 may be capable of linking a variety of entities. As an example and not by way of limitation, social-networking or VR system 1160 may enable users to interact with each other as well as receive content from third-party systems 1170 or other entities, or to allow users to interact with these entities through an application programming interfaces (API) or other communication channels.

In particular embodiments, a third-party system 1170 may include one or more types of servers, one or more data stores, one or more interfaces, including but not limited to APIs, one or more web services, one or more content sources, one or more networks, or any other suitable components, e.g., that servers may communicate with. A third-party system 1170 may be operated by a different entity from an entity operating social-networking or VR system 1160. In particular embodiments, however, social-networking or VR system 1160 and third-party systems 1170 may operate in conjunction with each other to provide social-networking services to users of social-networking or VR system 1160 or third-party systems 1170. In this sense, social-networking or VR system 1160 may provide a platform, or backbone, which other systems, such as third-party systems 1170, may use to provide social-networking services and functionality to users across the Internet.

In particular embodiments, a third-party system 1170 may include a third-party content object provider. A third-party content object provider may include one or more sources of content objects, which may be communicated to a client system 1130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or VR system 1160 also includes user-generated content objects, which may enhance a user's interactions with social-networking or VR system 1160. User-generated content may include anything a user can add, upload, send, or "post" to social-networking or VR system 1160. As an example and not by way of limitation, a user communicates posts to social-networking or VR system 1160 from a client system 1130. Posts may include data such as status updates or other textual data, location information, photos, videos, links, music or other similar data or media. Content may also be added to social-networking or VR system 1160 by a third-party through a "communication channel," such as a newsfeed or stream.

In particular embodiments, social-networking or VR system 1160 may include a variety of servers, sub-systems, programs, modules, logs, and data stores. In particular embodiments, social-networking or VR system 1160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or VR system 1160 may also include suitable components such as network interfaces, security mechanisms, load balancers, failover servers, management-and-network-operations consoles, other suitable components, or any suitable combination thereof. In particular embodiments, social-networking or VR system 1160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or VR system 1160 to one or more client systems 1130 or one or more third-party system 1170 via network 1110. The web server may include a mail server or other messaging functionality for receiving and routing messages between social-networking or VR system 1160 and one or more client systems 1130. An API-request server may allow a third-party system 1170 to access information from social-networking or VR system 1160 by calling one or more APIs. An action logger may be used to receive communications from a web server about a user's actions on or off social-networking or VR system 1160. In conjunction with the action log, a third-party content-object log may be maintained of user exposures to third-party content objects. A notification controller may provide information regarding content objects to a client system 1130. Information may be pushed to a client system 1130 as notifications, or information may be pulled from client system 1130 responsive to a request received from client system 1130. Authorization servers may be used to enforce one or more privacy settings of the users of social-networking or VR system 1160. A privacy setting of a user determines how particular information associated with a user may be shared. The authorization server may allow users to opt in to or opt out of having their actions logged by social-networking or VR system 1160 or shared with other systems (e.g., third-party system 1170), such as, for example, by setting appropriate privacy settings. Third-party content-object stores may be used to store content objects received from third parties, such as a third-party system 1170. Location stores may be used for storing location information received from client systems 1130 associated with users. Advertisement-pricing modules may combine social information, the current time, location information, or other suitable information to provide relevant advertisements, in the form of notifications, to a user.

Figure 12:
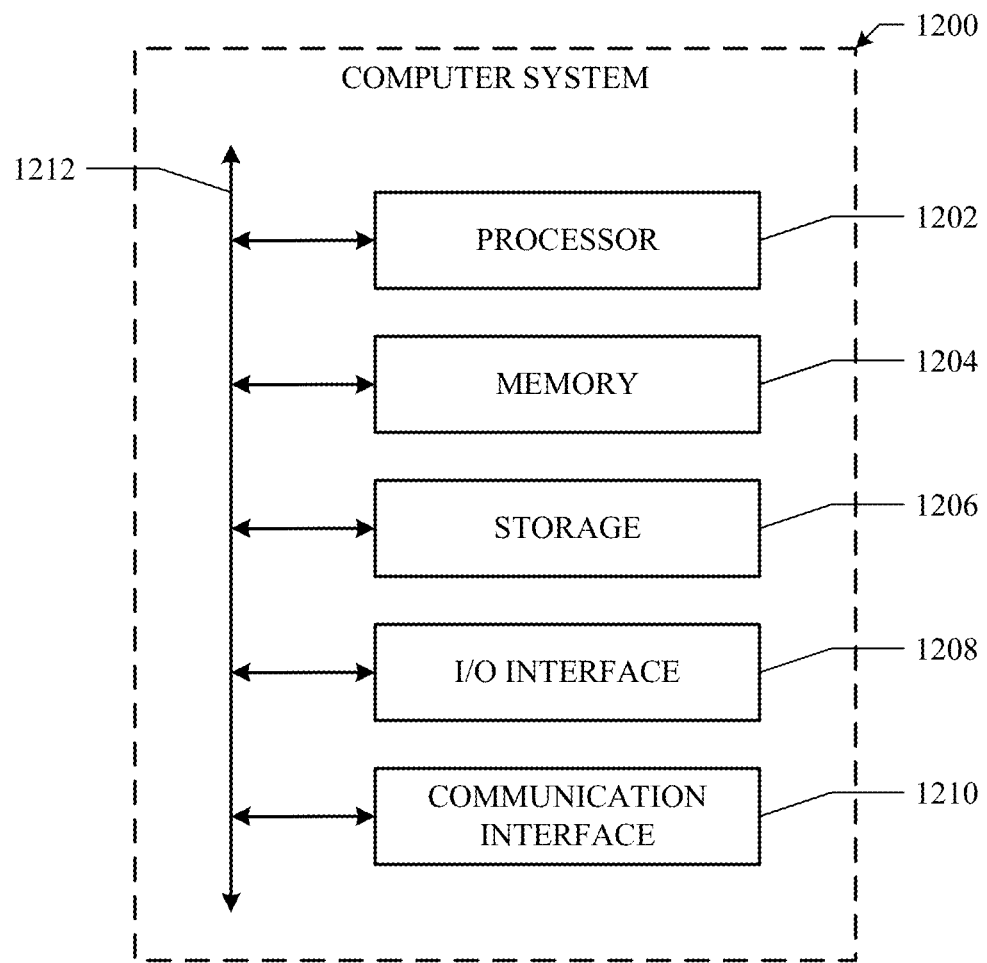
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   rendering, for one or more displays of a virtual reality (VR) display device, a first output image of a VR environment, wherein the VR environment comprises a personal user interface (UI) associated with a first user, wherein the personal UI has a first form factor and a first pose with respect to the first user, wherein the personal UI is a virtual object comprising one or more 2D virtual displays, and wherein the personal UI is operable to execute a plurality of applications;
   detecting a change in a context of the first user within the VR environment and with respect to a second user entering the VR environment;
   determining whether to adapt the personal UI based on the detected change in the context of the first user within the VR environment; and
   rendering, for the one or more displays of the VR display device, a second output image of the VR environment, wherein the personal UI is adapted to have a second form factor and a second pose with respect to the first user responsive to determining to adapt the personal UI based on the detected change in the context of the first user within the VR environment, wherein the second form factor and the second pose of the personal UI is predetermined and personalized based on settings inputted by the first user related to the second user.

2. The method of claim 1, wherein detecting the change in the context of the first user comprises:
   determining the first user has changed from a first pose to a second pose in the VR environment.

3. The method of claim 2, wherein determining the first user has changed from the first pose to the second pose comprises:
   determining whether a location of the user is within a threshold distance of an object in the VR environment; and
   determining whether an orientation of the user indicates the user is facing the object in the VR environment.

4. The method of claim 1, wherein detecting the change in the context of the first user comprises:
   receiving an input by the user selecting a particular application on the personal UI from the plurality of applications, wherein the particular application is associated with the second form factor and the second pose of the personal UI.

5. The method of claim 1, wherein detecting the change in the context of the first user comprises:
   detecting the first user has moved from a first virtual space to a second virtual space.

6. The method of claim 1, wherein detecting the change in the context of the first user comprises:
   detecting the first user has switched from using a first application to a second application on the personal UI.

7. The method of claim 1, wherein determining whether to adapt the personal UI based on the detected change in the context of the first user comprises:
   identifying a predetermined form factor and pose of the personal UI associated with an activity of the user in the VR environment.

8. The method of claim 1, wherein the personal UI comprises a plurality of 2D virtual displays, and wherein the plurality of 2D virtual displays are arranged in a tile-based layout comprising a plurality of preset orientations for the plurality of 2D virtual displays.

9. The method of claim 8, wherein a first 2D virtual display of the plurality of 2D virtual displays is operable to execute a first set of applications of the plurality of applications, and wherein a second 2D virtual display of the plurality of 2D virtual displays is operable to execute a second set of applications of the plurality of applications.

10. The method of claim 1, wherein the first form factor and the second form factor are selected from a group consisting of a virtual watch, a virtual smartphone, a virtual tablet, a virtual remote control, a virtual computer monitor, a virtual television, and a virtual movie screen.

11. The method of claim 1, wherein the VR environment comprises a shared virtual space for the first user, the second user, and one or more third users.

12. The method of claim 11, wherein privacy settings of the first user prevent the second and third users from viewing content on the personal UI associated with the first user.

13. The method of claim 11, further comprising:
casting content from the personal UI of the first user onto a shared virtual screen in the VR environment, wherein the content is viewable on the shared virtual screen by the first user and the second and third users.

14. The method of claim 1, wherein the plurality of applications correspond to applications on a real-world computing device associated with the first user.

15. The method of claim 1, further comprising:
receiving a user input comprising the settings for predetermining and personalizing the personal UI.

16. One or more computer-readable non-transitory storage media embodying software that is operable when executed to:
render, for one or more displays of a virtual reality (VR) display device, a first output image of a VR environment, wherein the VR environment comprises a personal user interface (UI) associated with a first user, wherein the personal UI has a first form factor and a first pose with respect to the first user, wherein the personal UI is a virtual object comprising one or more 2D virtual displays, and wherein the personal UI is operable to execute a plurality of applications;
detect a change in a context of the first user within the VR environment and with respect to a second user entering the VR environment;
determine whether to adapt the personal UI based on the detected change in the context of the first user within the VR environment; and
render, for the one or more displays of the VR display device, a second output image of the VR environment, wherein the personal UI is adapted to have a second form factor and a second pose with respect to the first user responsive to determining to adapt the personal UI based on the detected change in the context of the first user within the VR environment, wherein the second form factor and the second pose of the personal UI is predetermined and personalized based on settings inputted by the first user related to the second user.

17. The media of claim 16, wherein the software is operable when executed to detect the change in the context of the first user to:
determine the first user has changed from a first pose to a second pose in the VR environment.

18. The media of claim 16, wherein the software is operable when executed to determine the first user has changed from the first pose to the second pose to:
determine whether a location of the user is within a threshold distance of an object in the VR environment; and
determine whether an orientation of the user indicates the user is facing the object in the VR environment.

19. The media of claim 16, wherein the software is operable when executed to detect the change in the context of the first user to:
receive an input by the user selecting a particular application on the personal UI from the plurality of applications, wherein the particular application is associated with the second form factor and the second pose of the personal UI.

20. The media of claim 16, wherein the software is operable when executed to detect the change in the context of the first user to:
detect the first user has switched from using a first application to a second application on the personal UI.

21. A system comprising: one or more processors; and a non-transitory memory coupled to the processors comprising instructions executable by the processors, the processors operable when executing the instructions to:
render, for one or more displays of a virtual reality (VR) display device, a first output image of a VR environment, wherein the VR environment comprises a personal user interface (UI) associated with a first user, wherein the personal UI has a first form factor and a first pose with respect to the first user, wherein the personal UI is a virtual object comprising one or more 2D virtual displays, and wherein the personal UI is operable to execute a plurality of applications;
detect a change in a context of the first user within the VR environment and with respect to a second user entering the VR environment;
determine whether to adapt the personal UI based on the detected change in the context of the first user within the VR environment; and
render, for the one or more displays of the VR display device, a second output image of the VR environment, wherein the personal UI is adapted to have a second form factor and a second pose with respect to the first user responsive to determining to adapt the personal UI based on the detected change in the context of the first user within the VR environment, wherein the second form factor and the second pose of the personal UI is predetermined and personalized based on settings inputted by the first user related to the second user.

* * * * *